United States Patent
Machovoe et al.

(10) Patent No.: US 11,061,156 B2
(45) Date of Patent: Jul. 13, 2021

(54) MICROSEISMIC VELOCITY MODELS DERIVED FROM HISTORICAL MODEL CLASSIFICATION

(71) Applicant: Halliburton Energy Services, Inc., Houston, TX (US)

(72) Inventors: Sean Robert Machovoe, Houston, TX (US); James Brady Carmichael, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 129 days.

(21) Appl. No.: 16/566,727

(22) Filed: Sep. 10, 2019

(65) Prior Publication Data

US 2021/0072416 A1    Mar. 11, 2021

(51) Int. Cl.
*G01V 1/28* (2006.01)
*G01V 1/30* (2006.01)
G06F 17/15 (2006.01)

(52) U.S. Cl.
CPC .............. *G01V 1/282* (2013.01); *G01V 1/288* (2013.01); *G01V 1/303* (2013.01); *G06F 17/15* (2013.01)

(58) Field of Classification Search
CPC ........ G01V 1/282; G01V 1/288; G01V 1/303; G06F 17/15
See application file for complete search history.

(56) References Cited

U.S. PATENT DOCUMENTS

| 8,982,671 B2 * | 3/2015 | Willis .................... G10K 15/04 367/145 |
| 10,724,346 B2 * | 7/2020 | Eftekhari Far ...... G01V 99/005 |
| 2011/0141846 A1 * | 6/2011 | Uhl .......................... G01V 1/40 367/35 |
| 2016/0238724 A1 | 8/2016 | Bardainne |

FOREIGN PATENT DOCUMENTS

| CA | 2562005 C | 3/2013 |
| CA | 2961168 A1 | 4/2016 |
| CN | 104502964 B | 1/2017 |
| CN | 106353794 A | 1/2017 |
| CN | 104749630 B | 5/2017 |
| CN | 105116444 B | 8/2017 |
| WO | WO-2018148492 A1 | 8/2018 |

* cited by examiner

*Primary Examiner* — Elias Desta

(57) ABSTRACT

System and methods for generating microseismic velocity models are provided. One or more existing well sites in proximity to a planned well site are selected. Historical microseismic velocity models associated with the selected well sites are obtained. The formation depths for each velocity component of the historical models are correlated to formation depths from well logs acquired for a subsurface formation associated with the planned well site. A classification and non-linear regression on the historical microseismic velocity models is performed to identify the best-fitting velocity components for layers of the subsurface formation corresponding to the correlated formation depths. An initial microseismic velocity model of the formation is generated using the best-fitting velocity components. Seismic wave propagation through each layer of the formation is simulated using the generated model. Locations of one or more microseismic events of interest within the formation are estimated, based on the simulated wave propagation.

20 Claims, 14 Drawing Sheets

| Historical Velocity Components | | | | | |
|---|---|---|---|---|---|
| TVD_ft | Vp_ft/s | Vs_ft/s | Delta | Epsilon | Gamma |
| 7832.00 | 14556 | 7040.00 | −0.03 | 0.06 | 0.09 |
| 7967.00 | 14946 | 7231.00 | 0.07 | 0.07 | 0.07 |
| 8112.00 | 13049 | 6927.00 | 0.06 | 0.09 | 0.08 |
| 8177.00 | 13415 | 8751.00 | −0.07 | 0.08 | 0.12 |
| 8282.00 | 15023 | 8773.00 | 0.09 | 0.06 | 0.11 |
| 8477.00 | 14617 | 8364.00 | 0.09 | 0.08 | 0.11 |
| 8737.00 | 14581 | 8911.00 | 0.25 | 0.09 | 0.08 |
| 8862.00 | 15253 | 8911.00 | −0.03 | 0.06 | 0.05 |
| 9107.00 | 15182 | 8852.00 | −0.11 | 0.11 | 0.09 |
| 9222.00 | 15993 | 9016.00 | −0.10 | 0.10 | 0.09 |
| 9382.00 | 12776 | 8001.00 | 0.35 | 0.13 | 0.11 |
| 9617.00 | 11969 | 7651.00 | 0.31 | 0.14 | 0.09 |
| 9712.00 | 14176 | 8453.00 | 0.25 | 0.11 | 0.09 |
| 9767.00 | 13489 | 8423.00 | 0.09 | 0.14 | 0.11 |
| 9822.00 | 11837 | 7239.00 | 0.30 | 0.11 | 0.09 |
| 9917.00 | 12725 | 7770.00 | 0.09 | 0.09 | 0.08 |
| 10067.00 | 11956 | 6471.00 | 0.17 | 0.10 | 0.10 |
| 10197.00 | 11401 | 6125.00 | 0.05 | 0.07 | 0.11 |
| 10382.00 | 10465 | 7377.00 | 0.19 | 0.08 | 0.08 |
| 10472.00 | 12880 | 8022.00 | 0.08 | 0.07 | 0.07 |
| 7832.00 | 14556 | 7040.00 | −0.03 | 0.06 | 0.09 |
| 7967.00 | 14946 | 7231.00 | 0.07 | 0.07 | 0.07 |
| 8112.00 | 13049 | 6927.00 | 0.06 | 0.09 | 0.08 |
| 8177.00 | 13415 | 8751.00 | −0.07 | 0.08 | 0.12 |
| 8282.00 | 15023 | 8773.00 | 0.09 | 0.06 | 0.11 |
| 8477.00 | 14617 | 8364.00 | 0.09 | 0.08 | 0.11 |
| 8737.00 | 14581 | 8911.00 | 0.25 | 0.09 | 0.08 |
| 8862.00 | 15253 | 8911.00 | −0.03 | 0.06 | 0.05 |
| 9107.00 | 15182 | 8852.00 | −0.11 | 0.11 | 0.09 |
| 9222.00 | 15993 | 9016.00 | −0.10 | 0.10 | 0.09 |
| 9382.00 | 12776 | 8001.00 | 0.35 | 0.13 | 0.11 |
| 9617.00 | 11969 | 7651.00 | 0.31 | 0.14 | 0.09 |
| 9712.00 | 14176 | 8453.00 | 0.25 | 0.11 | 0.09 |
| 9767.00 | 13489 | 8423.00 | 0.09 | 0.14 | 0.11 |
| 9822.00 | 11837 | 7239.00 | 0.30 | 0.11 | 0.09 |
| 9917.00 | 12725 | 7770.00 | 0.09 | 0.09 | 0.08 |
| 10067.00 | 11956 | 6471.00 | 0.17 | 0.10 | 0.10 |

FIG.5

| Best-Fitting Velocity Components | | | | | |
|---|---|---|---|---|---|
| TVD | Vp | Vs | Delta | Epsilon | Gamma |
| 6773 | 12102.83 | 6952.742 | 0.129701 | 0.148613 | 0.152338 |
| 6913 | 13136.69 | 7834.393 | 0.137569 | 0.155388 | 0.159692 |
| 7048 | 13612.32 | 8316.428 | 0.140928 | 0.15904 | 0.165204 |
| 7343 | 13823.47 | 8519.487 | 0.132408 | 0.15586 | 0.16642 |
| 7613 | 13913.29 | 8346.724 | 0.113936 | 0.143793 | 0.152861 |
| 7832 | 13915.07 | 8266.517 | 0.102361 | 0.134067 | 0.136389 |
| 7913 | 13866.66 | 8266.391 | 0.100093 | 0.131332 | 0.130414 |
| 7967 | 13821.59 | 8275.207 | 0.099206 | 0.129824 | 0.126711 |
| 7993 | 13797.41 | 8281.856 | 0.098942 | 0.129187 | 0.125035 |
| 8112 | 13683.28 | 8329.958 | 0.098794 | 0.126925 | 0.118449 |
| 8177 | 13632.83 | 8366.216 | 0.099179 | 0.126056 | 0.115713 |
| 8213 | 13612.97 | 8388.432 | 0.099438 | 0.125653 | 0.114479 |
| 8282 | 13596.67 | 8433.558 | 0.099873 | 0.124979 | 0.112685 |
| 8438 | 13685.87 | 8533.07 | 0.099627 | 0.123574 | 0.111278 |
| 8477 | 13734.57 | 8553.885 | 0.099159 | 0.123191 | 0.111453 |

FIG.7

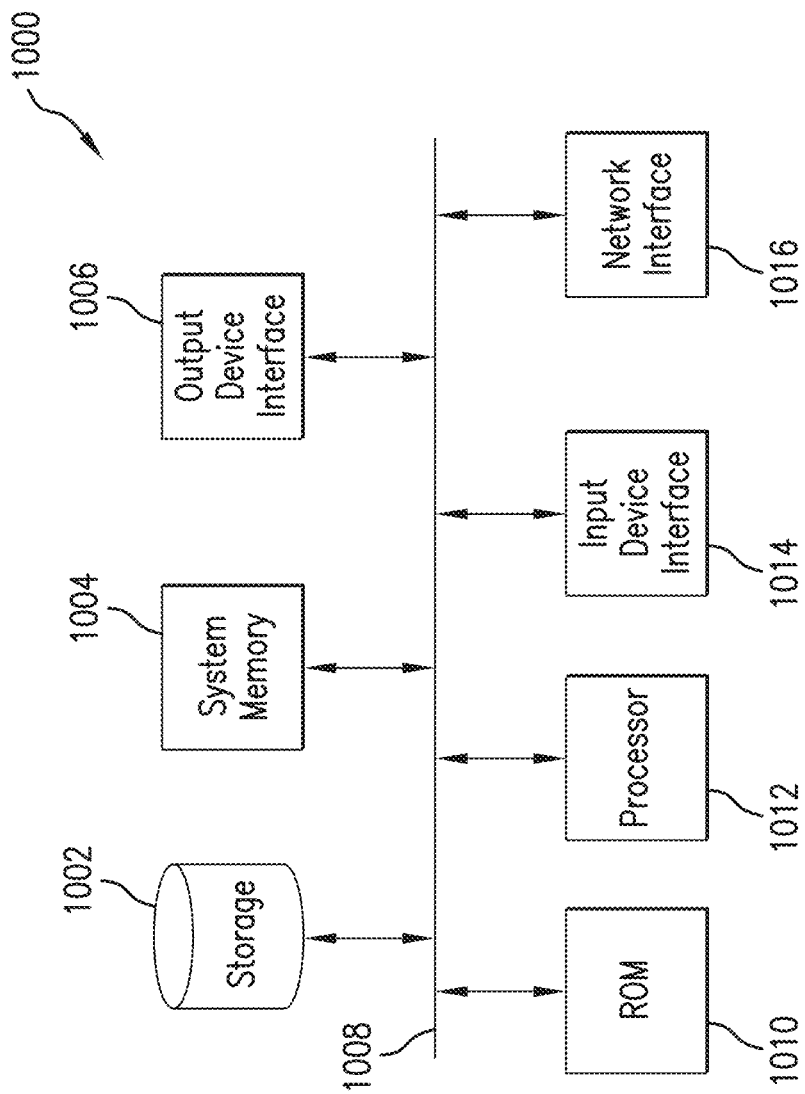

MICROSEISMIC VELOCITY MODELS DERIVED FROM HISTORICAL MODEL CLASSIFICATION

FIELD OF THE DISCLOSURE

The present disclosure relates generally to seismic velocity modeling and particularly, to generating seismic velocity models for well planning and drilling.

BACKGROUND

Knowing the properties and locations of underground rock formations is useful for making decisions as to where and how to economically produce hydrocarbons from underground reservoirs. In the field of hydrocarbon exploration and production, seismic imaging techniques may be used to gain an understanding of the depth and structures of subsurface geological formations. Various seismic sources, such as dynamite, "thumper" trucks, air guns, and other noise sources located at the surface of a hydrocarbon bearing field, may be used to propagate seismic waves through an underground formation. The propagated waves are reflected through the formation and acquired using various seismic signal receiver devices, for example, geophones, hydrophones, and the like. Seismic-data traces including a record of the sound wave reflections acquired from the underground formation may be used to generate three-dimensional images of subsurface geological structures, including faults and other stratigraphic features that trap hydrocarbon and mineral deposits. Wells are drilled and completed in these stratigraphic features and hydrocarbon traps with the purpose of recovering such deposits. In unconventional reservoirs or formations with very low permeability, a specialized completion strategy known as hydraulic fracture stimulation is employed. These stimulations increase the permeability of the formations and improve the economic recovery of the well.

During hydraulic fracture stimulations fluids are injected into the well at rates and pressures sufficient to break the formation as it exits the perforated holes. Micro-earthquakes are generated as the formation rock breaks down. Geophones run on wireline or fiber-optic cable in nearby offset wells can detect the sound waves emitted from these rock breaks. Application of a competent velocity model to the arrival times of the sound waves facilitate the location in two- or three-dimensional space. Seismic imaging and microseismic location analysis become more complex when the subsurface formation has fractures, a preferred orientation of grains, tectonic stress regimes or other geo-mechanical variations. In such cases, the subsurface medium of the formation layer being imaged may exhibit seismically anisotropic characteristics. Therefore, the velocity model employed in the seismic imaging and event location analysis needs to have a high level of accuracy and adhere to geological, petrophysical and geophysical properties.

BRIEF DESCRIPTION OF THE DRAWINGS

FIG. 5 is a table illustrating velocity components of historical velocity models associated with the selected well sites of FIG. 4.

FIG. 7 is a table illustrating values of the best-fitting $V_P$, $V_S$, delta, epsilon, and gamma velocity model components sorted by true vertical depth (TVD) for a planned well site.

FIG. 10 is a block diagram of an exemplary computer system in which embodiments of the present disclosure may be implemented.

DESCRIPTION OF ILLUSTRATIVE EMBODIMENTS

Figure 1A:
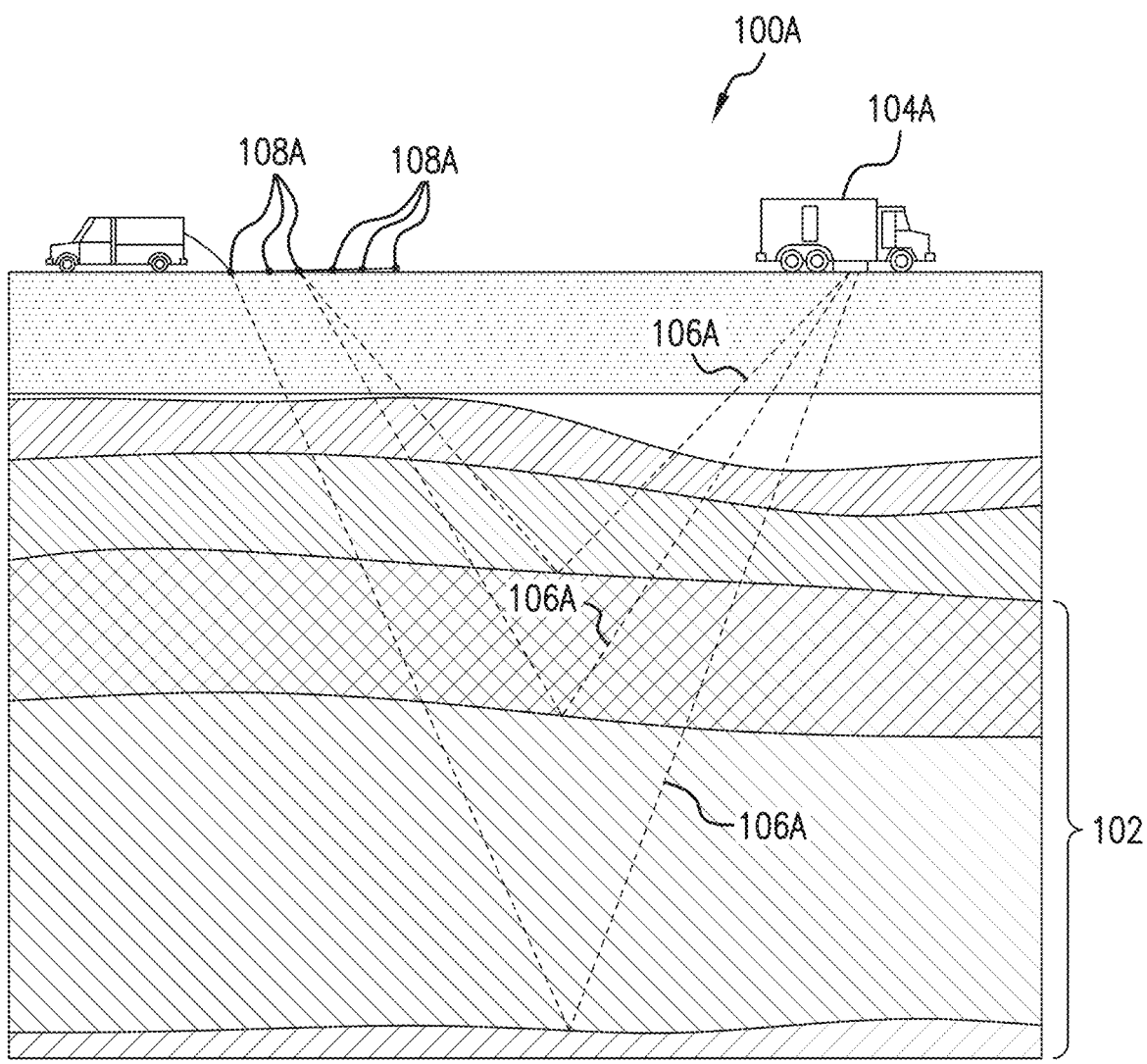
FIG. 1A is a side elevation view of a surface seismic survey system for a subsurface formation in accordance with one or more embodiments.

Embodiments of the present disclosure relate to generating optimal initial microseismic velocity models based on historical velocity models. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to generate optimized microseismic velocity models for different microseismic applications. Such applications may include, for example, locating and monitoring microseismic events of interest within a subsurface formation based on microseismic data captured using various seismic measurement devices. Examples of such devices include, but are not limited to, geophones, hydrophones, and fiber optic sensors for measuring seismic energy. In one or more embodiments, a microseismic velocity model for mapping a new or planned well site in a hydrocarbon producing field may be generated based on historical velocity models associated with one or more previously mapped well sites in proximity to the planned well site.

It should be appreciated that the mapping of a well site in the context of microseismic velocity modeling as described herein includes mapping the subsurface formation at the well site based on microseismic data derived from simulations using one or more microseismic velocity models or measurements obtained from an actual seismic survey of the formation or a combination thereof. For example, the velocity model that is generated for the planned well site may serve as an optimal starting point for simulating seismic wave propagation and estimating the locations of microseismic events of interest within the corresponding formation. The initial velocity model in this example may be further optimized based on new microseismic data collected by seismic measurement devices at the planned well site. By leveraging historical microseismic velocity data, the disclosed techniques provide more reliable starting microseismic velocity models that produce more accurate estimates of microseismic event locations relative to conventional velocity modeling techniques. This in turn reduces processing time and improves system performance for real-time microseismic applications at the well site.

Illustrative embodiments and related methodologies of the present disclosure are described below in reference to FIGS. 1-10 as they might be employed, for example, in a computer system for microseismic velocity modeling and reservoir simulation applications. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1A is a side elevation view of a surface seismic survey system 100A for a subsurface formation 102 in accordance with one or more embodiments. Subsurface formation 102 may be, for example, a hydrocarbon bearing formation including a plurality of rock layers at varying depths. System 100A may be used to conduct a surface seismic survey that provides a seismic mapping of formation 102. System 100A includes a seismic source 104A and an array of seismic receivers 108A. As shown in FIG. 1A, seismic source 104A may be a specialized "thumper" truck that generates seismic energy 106A. However, it should be noted that embodiments are not limited thereto and that seismic source 104A may be implemented using any of various other types of seismic sources including, but not limited to, air guns, dynamite or other types of explosives.

In conducting the surface seismic survey, seismic energy 106A may be shot from source 104A in the form of pulses or waves that propagate to and encounter different layers of formation 102. For each layer encountered, a portion of seismic energy 106A is reflected towards the earth's face and received by one or more of seismic receivers 108A at the surface. Seismic receivers 108A may be any of various seismic measurement devices located at the Earth's surface or downhole at the depth of the target formation 102. Such devices may include, for example and without limitation, a geophone, hydrophone, fiber optic sensors, e.g., distributed acoustic sensing (DAS) devices, or any other seismic measurement device for detecting and measuring waves of seismic energy 106A shot from source 104A and recording arrival times and amplitudes of the detected waves.

The surface seismic survey conducted using system 100A may be, for example, an initial exploratory survey conducted over a relatively large area of earth to obtain a relatively low-resolution mapping of the geometry of subsurface formation 102. Such a broad-based seismic survey may be used in conjunction with core samples and/or well logs from one or more exploratory wellbores for purposes of hydrocarbon exploration and well planning. From the initial exploratory survey, a determination may be made as to a particular location within formation 102 that is likely to contain hydrocarbons. For further exploration and planning purposes, a more detailed vertical seismic profile (VSP) survey of the particular location may be conducted, as illustrated by the example shown in FIG. 1B.

Figure 1B:
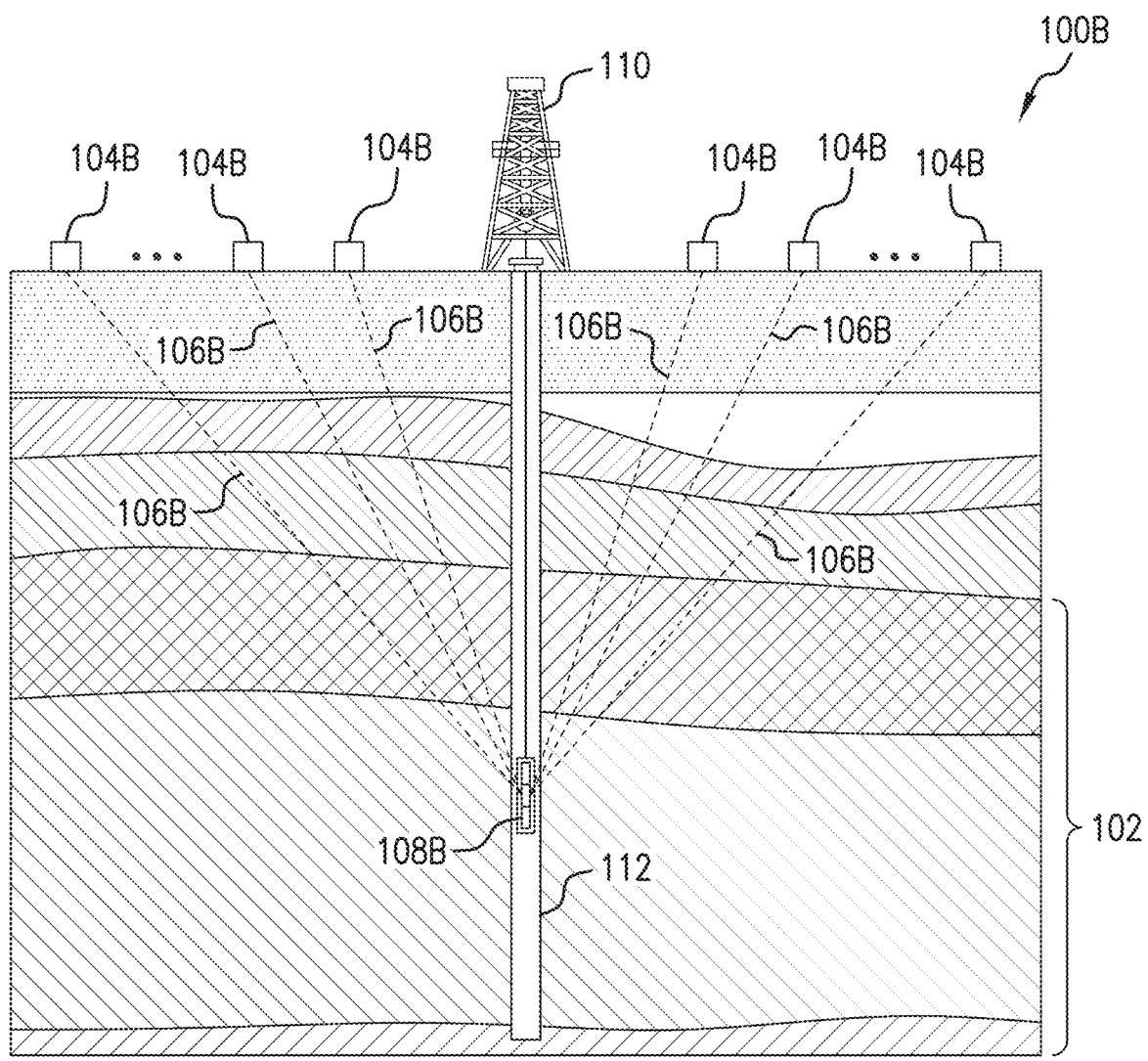
FIG. 1B is a side elevation view of a vertical seismic profile (VSP) survey system for the subsurface formation of FIG. 1A in accordance with one or more embodiments.

FIG. 1B is a side elevation view of a seismic survey system 100B for conducting a VSP survey of subsurface formation 102 in accordance with one or more embodiments. As shown in FIG. 1B, a drilling rig 110B at the surface may be used to drill a wellbore 112B into different layers of formation 102. A plurality of seismic sources 104B at the surface are used to generate seismic energy 106B that propagates through the different layers of formation 102, as described above. It should be appreciated that any number of seismic sources may be used as desired for a particular implementation. Seismic sources 104B may be implemented using any of various seismic source devices, e.g., dynamite or other explosives, thumper trucks, air guns, or other noise sources. The waves of seismic energy 106B and direct arrival times from sources 104B are detected and recorded by an array of seismic receivers 108B disposed within wellbore 112B. Seismic receivers 108B may be, for example, an array of downhole seismic measurement devices, e.g., geophones, hydrophones or fiber optic sensors, coupled to or integrated within a bottom hole assembly of a drill string or wireline logging tool disposed within borehole 112B.

In one or more embodiments, seismic receivers 108B may be used to record microseismic data including measured or observed travel times of seismic energy waves generated by seismic sources 104B. Such travel time data may include, for example, first arrival times of direct qP-wave and/or qS-wave propagations between different seismic sources 104B and seismic receivers 108B. In one or more embodiments, the seismic receivers of the seismic survey system may be used to detect microseismic events, such as microearthquakes, caused by downhole operations within the wellbore, as will be described in further detail below with respect to FIGS. 1C and 1D.

Figure 1C:
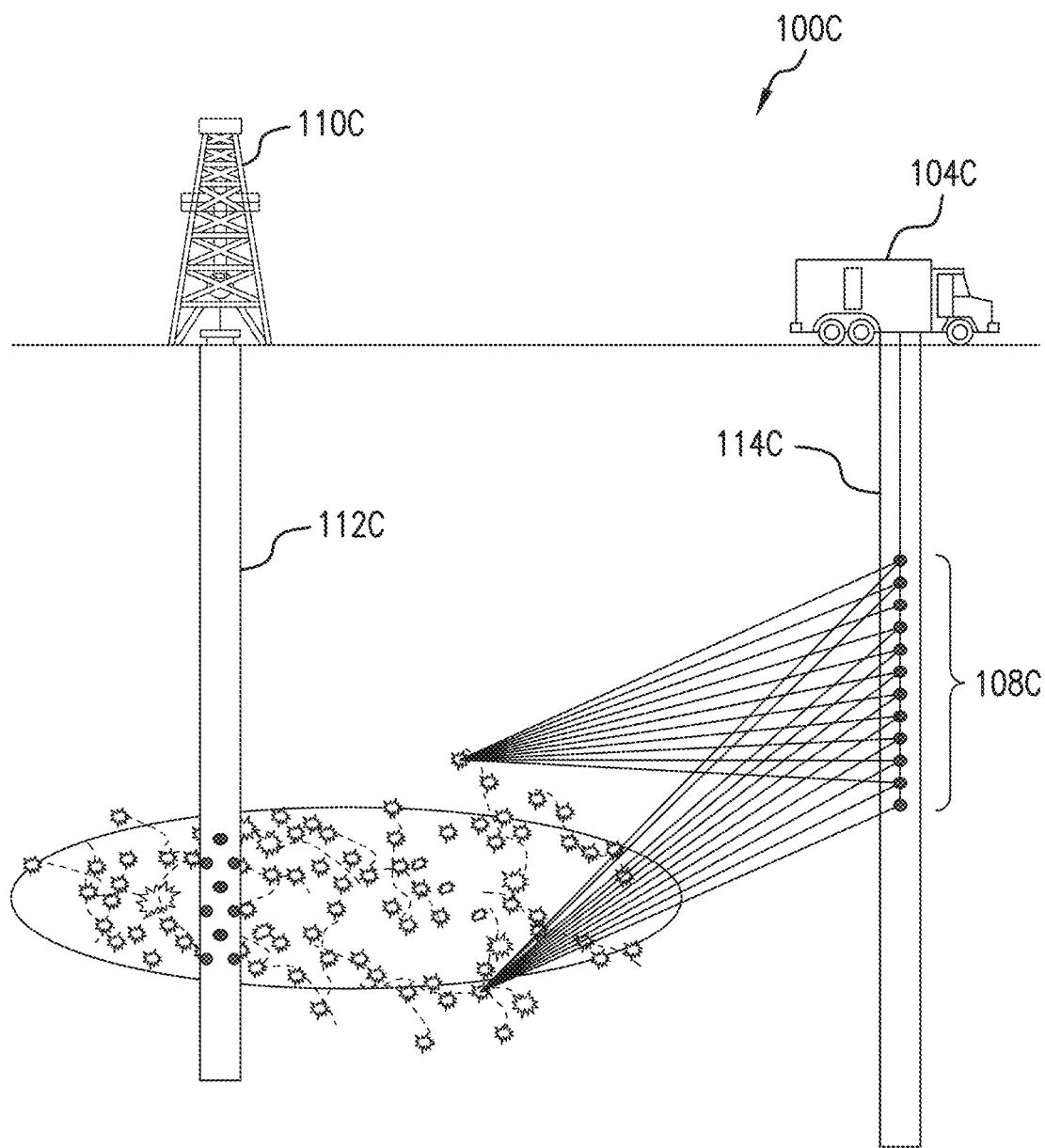
FIG. 1C is a diagram of another VSP survey system for detecting microseismic events within a formation surrounding a vertical well undergoing a hydraulic fracture stimulation treatment.

FIG. 1C is a diagram of a VSP survey system 100C for detecting microseismic events within a formation surrounding a vertical well 112C undergoing a hydraulic fracture stimulation treatment. The hydraulic fracture stimulation treatment in this example may involve injecting a fracturing fluid from a drilling rig 110C into the formation via perforations along vertical well 112C. As shown in FIG. 1C, seismic receivers 108C in an offset well 114C near vertical well 112C may be used to detect microearthquakes caused by the fluid injection in an area of the formation surrounding vertical well 112C. Seismic receivers 108C may be any of various seismic measurement devices for detecting and recording the sound waves emitted by the microearthquakes from the slipping of micro fault planes within the formation. Examples of such measurement devices include, but are not limited to, geophones, hydrophones, fiber optic sensors, e.g., distributed acoustic sensing (DAS) devices. The microseismic data recorded by seismic receivers 108C may then be transmitted to a control system 104C at the surface of offset well 114C for processing. In one or more embodiments, control system 104C may include a data processing device or computer system that applies the microseismic data as inputs to a microseismic velocity model for estimating the locations of the microearthquakes in a two-dimensional or three-dimensional space corresponding to the relevant formation area surrounding vertical well 112C.

Figure 1D:
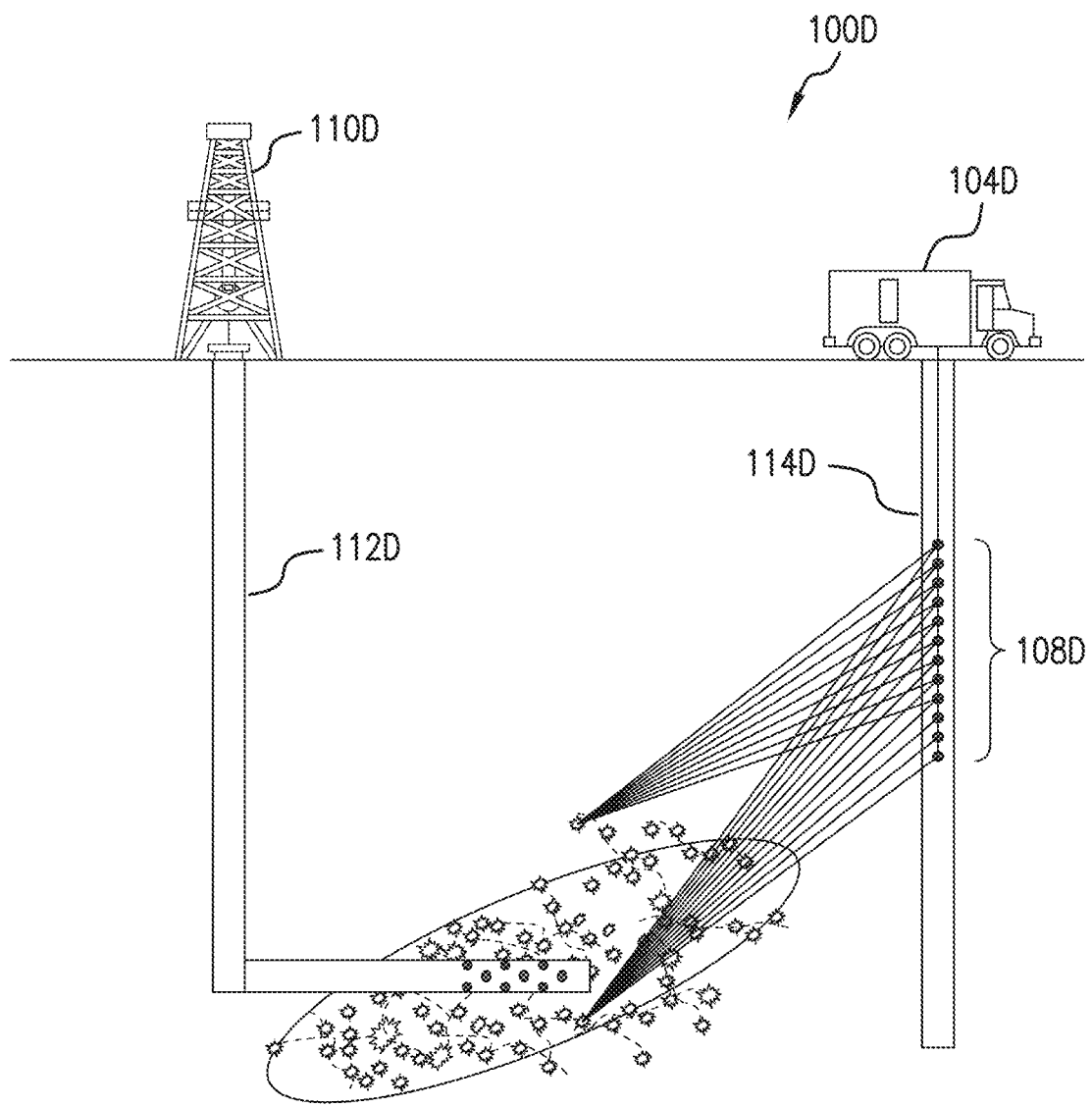
FIG. 1D is a diagram of yet another VSP survey system for detecting microseismic events within a formation surrounding a horizontal or deviated well undergoing a hydraulic fracture stimulation treatment.

In a similar example, FIG. 1D illustrates a VSP survey system 100D for detecting microseismic events within an area of the formation surrounding a horizontal or deviated well 112D associated with a drilling rig 110D. Like vertical well 112C of FIG. 1C, well 112D may be undergoing a hydraulic fracture stimulation treatment in which fracturing fluid is injected into the formation via perforations along a horizontal/deviated portion of well 112D. The microearthquakes generated by the stimulation treatment in this example are detected and recorded by seismic receivers 108D in an offset well 114D. The recorded data is transmitted to a surface control system 104D for processing. Like, control system 104C of FIG. 1C, control system 104D may include a computer system that applies the microseismic data as inputs to a microseismic velocity model for estimating the locations of the microearthquakes in a two-dimensional or three-dimensional space corresponding to the relevant formation area surrounding well 112D. While the offset wells are shown in FIGS. 1C and 1D as vertical wells, it should be appreciated that the disclosed techniques may be applied using other VSP system configurations with seismic measurement devices disposed within deviated offsets wells.

In one or more embodiments, the microseismic velocity model used to process the microseismic data in VSP systems 100C and 100D of FIGS. 1C and 1D, as described above, may be an initial microseismic velocity model generated from historical velocity models. In some cases, the microseismic data collected by the seismic receivers in the above examples may be used to optimize or refine the initial microseismic velocity model. The historical velocity models used to generate the initial model in this example may be associated with one or more previously mapped well sites within the same hydrocarbon producing field, which are located near or within a predetermined distance of a planned well site to be mapped using the initial microseismic velocity model, as will be described in further detail below.

Figure 2:
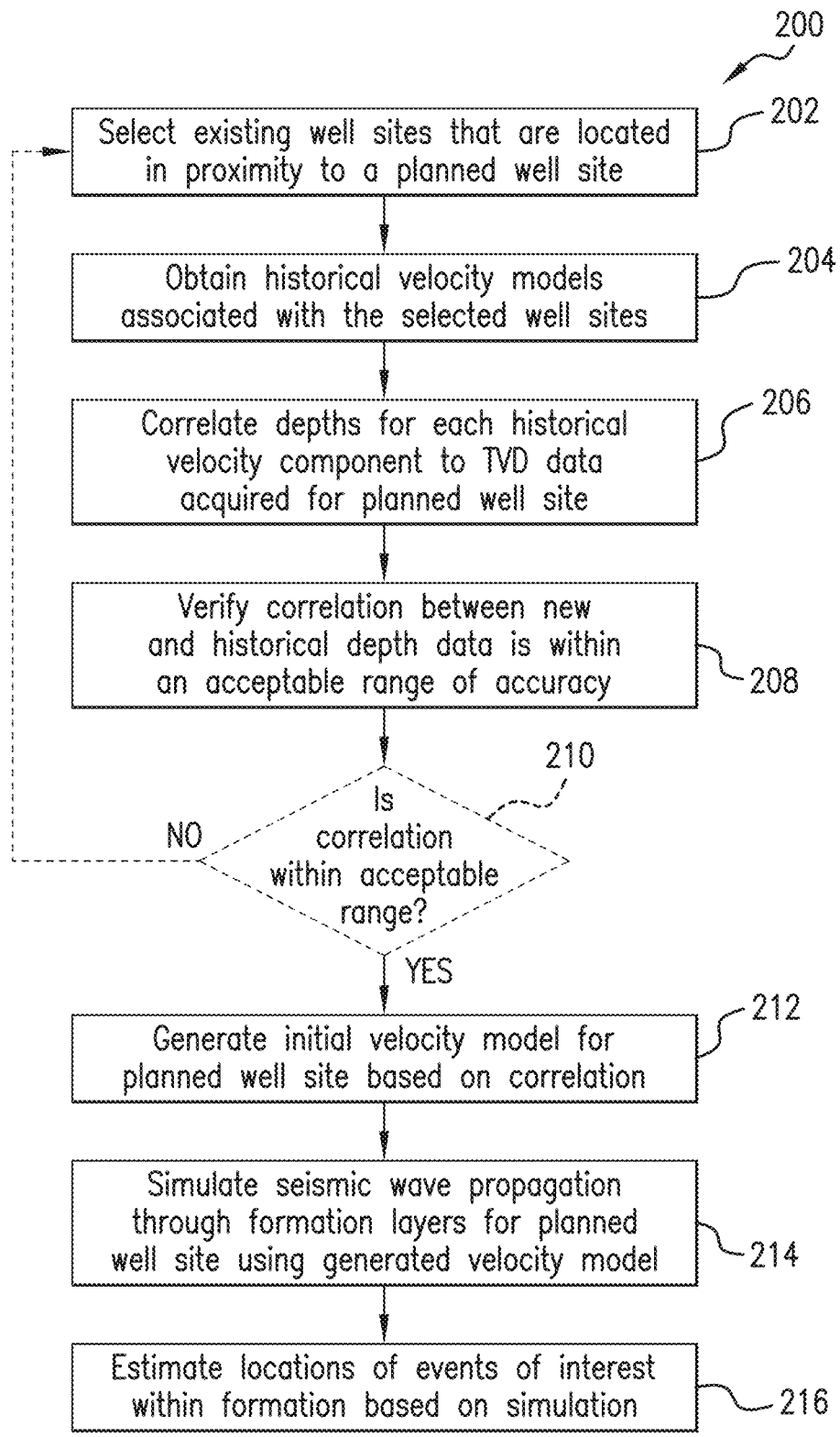
FIG. 2 is a flowchart of a process for generating an initial microseismic velocity model for a planned wellsite in a hydrocarbon producing field based on historical microseismic velocity models associated with existing well sites in the field.

FIG. 2 is a flowchart of a process 200 for generating an initial microseismic velocity model to map the subsurface of a planned wellsite in a hydrocarbon producing field based on historical microseismic velocity models corresponding to previously mapped well sites in the field. For purposes of discussion, process 200 may be described with reference to systems 100A and 100B of FIGS. 1A and 1B, respectively, as described above. However, process 200 is not intended to be limited thereto.

Figure 3:
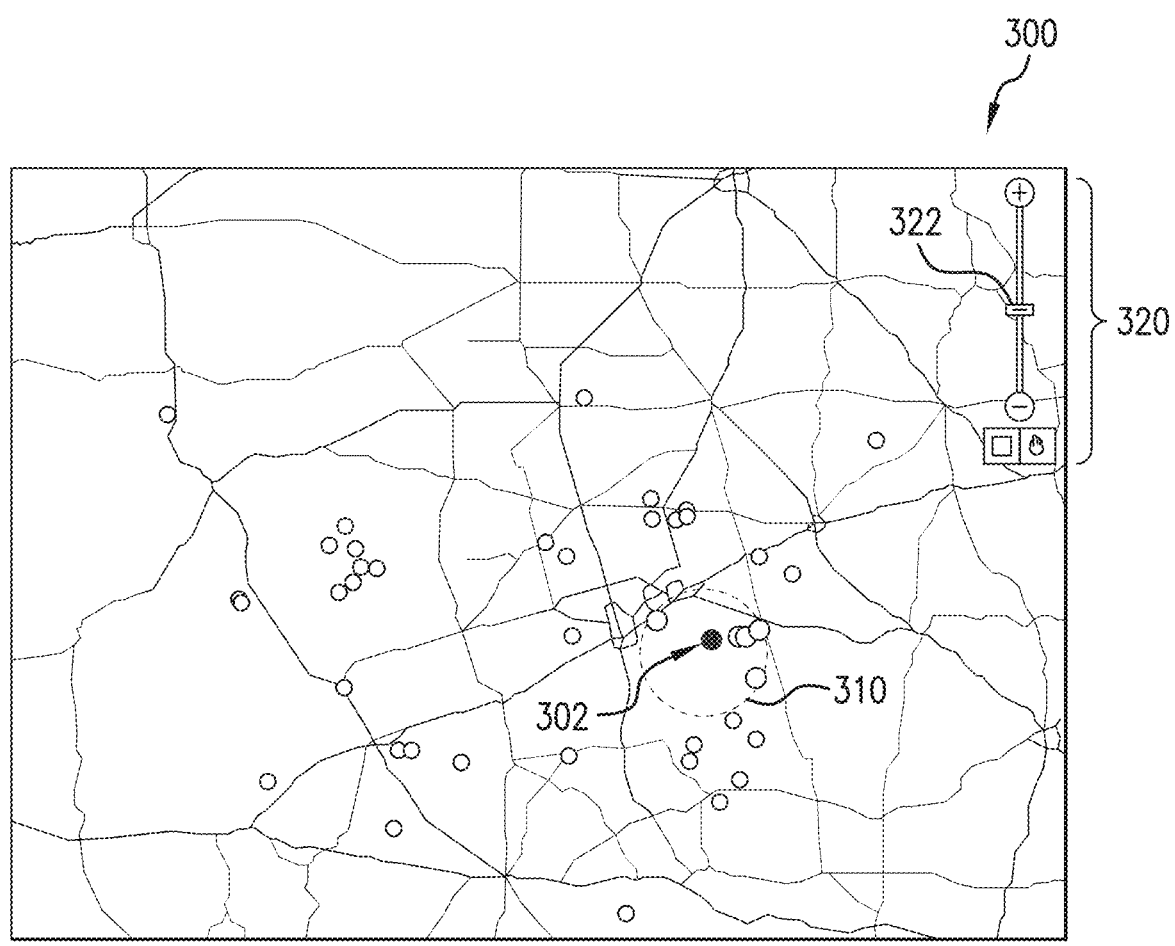
FIG. 3 is a view of a hydrocarbon producing field map including a plurality of previously mapped well sites surrounding a planned well site.

As shown in the example of FIG. 2, process 200 may begin in block 202, which includes selecting one or more existing well sites in proximity to a planned well site within a hydrocarbon producing field. In one or more embodiments, the one or more existing well sites may be selected from a plurality of previously mapped well sites within the field, as illustrated in FIG. 3. FIG. 3 is a view 300 of a hydrocarbon producing field map including a plurality of previously mapped well sites surrounding a planned well site 302. The existing well sites, which are selected from the plurality of previously mapped well sites in the example shown in FIG. 3, may be located within an area 310 surrounding well site 302. In one or more embodiments, the well sites are selected based on user input received via a graphical user interface (GUI) of a reservoir simulation application executable at the user's device. Accordingly, view 300 of the hydrocarbon producing field map may be displayed within an interactive window of the GUI, which may provide various user control elements that the user can manipulate for viewing and selecting different well sites. For example, the GUI may provide a set of view controls 320 within view 300 may include a slider control 322 that allows the user to control a zoom level or magnification of the hydrocarbon producing field as shown within view 300 using a user input device, e.g., a touch-screen, mouse or other pointer device. Thus, the user in this example may use the slider control 322 to zoom-in or magnify the portion of view 300 near area 310.

Figure 4:
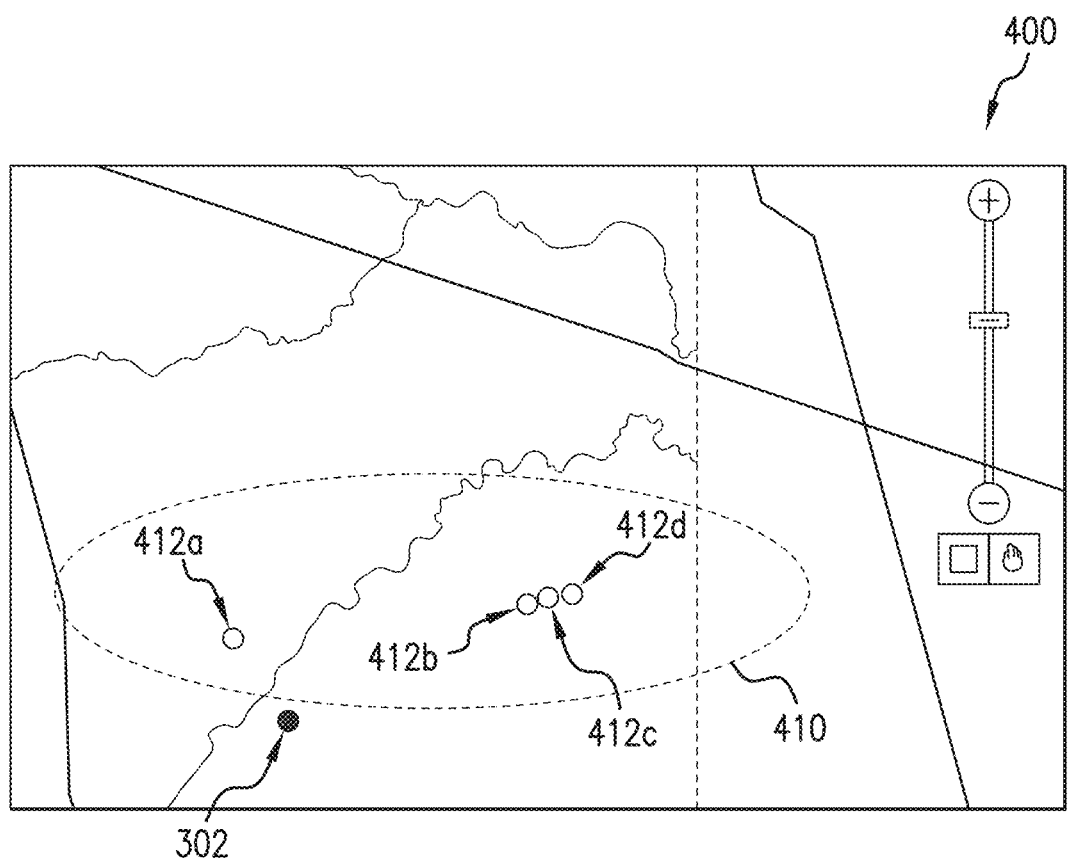
FIG. 4 is a magnified view of the hydrocarbon field of FIG. 3 illustrating selected well sites in proximity to the planned well site.

FIG. 4 shows an example of a magnified view 400 of the hydrocarbon field map of FIG. 3, which may be displayed within the above-described GUI as a result of input received from the user via slide control 322. The user may then specify the previously mapped well sites of interest by using the user input device to select a visual indicator or marker corresponding to each well site as displayed within the GUI. As illustrated by the example in FIG. 4, the user may select well sites 412a, 412b, 412c and 412d (or collectively, "well sites 412a-d") that are in proximity to planned well site 302 and within an area 410 of magnified view 400 of the hydrocarbon field map. In one or more embodiments, the proximity of each previously mapped well site to the planned well site within the field may be based on a predetermined distance that serves as a maximum threshold to limit the well sites that may be selected to only those within a certain radius of the planned well site. Thus, well sites 412a-d in FIG. 4 may be previously mapped well sites that are located within, i.e., no further than, a predetermined distance from planned well site 302.

In one or more embodiments, the proximity of each previously mapped well site to the planned well site may be only one of the factors considered in the selection. For example, in addition to the proximity of each previously mapped well site to the planned well site, the selection of well sites may also consider the degree of similarity between one or more formation properties associated with the planned well site and those associated with each of the previously mapped sites. Examples of formation properties that may be considered include, but are not limited to, formation depth, permeability, porosity, and any other geological or lithological property that can be used to distinguish one formation from another. The degree of similarity between the formation properties of a previously mapped well site and the new well site to be mapped may be based on a comparison of well logs from the respective well sites.

In some implementations, the degree of similarity between the previously mapped sites and the planned well site may be determined by clustering the previously mapped well sites according to location and shared formation properties relative to those of the planned well site. It should be appreciated that any of various clustering techniques may be used for this purpose. For example, K-Means clustering may be used to cluster the previously mapped well sites according to their respective locations, e.g., based on XYZ coordinates of each well site as obtained from a global positioning system (GPS) and a formation property, such as depth.

Returning to FIG. 2, once the one or more existing well sites have been selected in block 202, process 200 may proceed to block 204, which includes obtaining historical microseismic velocity models associated with the selected well sites. In one or more embodiments, the historical velocity models may be obtained from a historical database including a repository of microseismic velocity models that were previously generated for operations conducted at each of the previously mapped well sites in the field. It should be appreciated that the database may also store the microseismic velocity models for prior operations at well sites in other fields, including those with similar subsurface formation properties as the well sites in the current field of interest. The historical velocity models obtained for the selected well sites may include a plurality of velocity components. FIG. 5 is a table 500 illustrating velocity components of historical velocity models that may be associated with the well sites selected in block 202, e.g., selected well sites 412a-d of FIG. 4, as described above. As shown in table 500, the velocity components of each model may include, for example and without limitation, Primary ($V_P$), Secondary ($V_S$), Delta, Epsilon, and Gamma, as calculated or measured over different formation depths, e.g., true vertical depth (TVD) in units of feet.

Figure 6A:
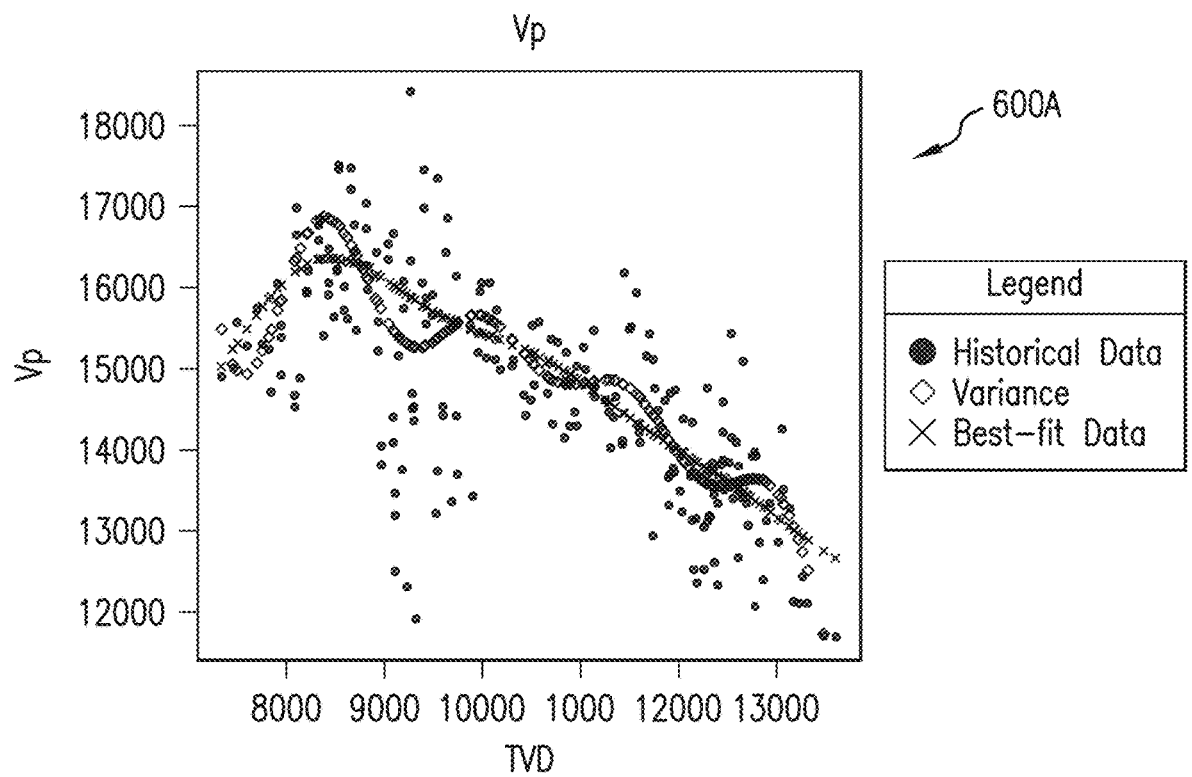
FIGS. 6A, 6B, and 6C are data plots illustrating examples of the best-fitting $V_P$, epsilon, and gamma velocity components, respectively, based on a non-linear regression on the historical velocity models.
Figure 6B:
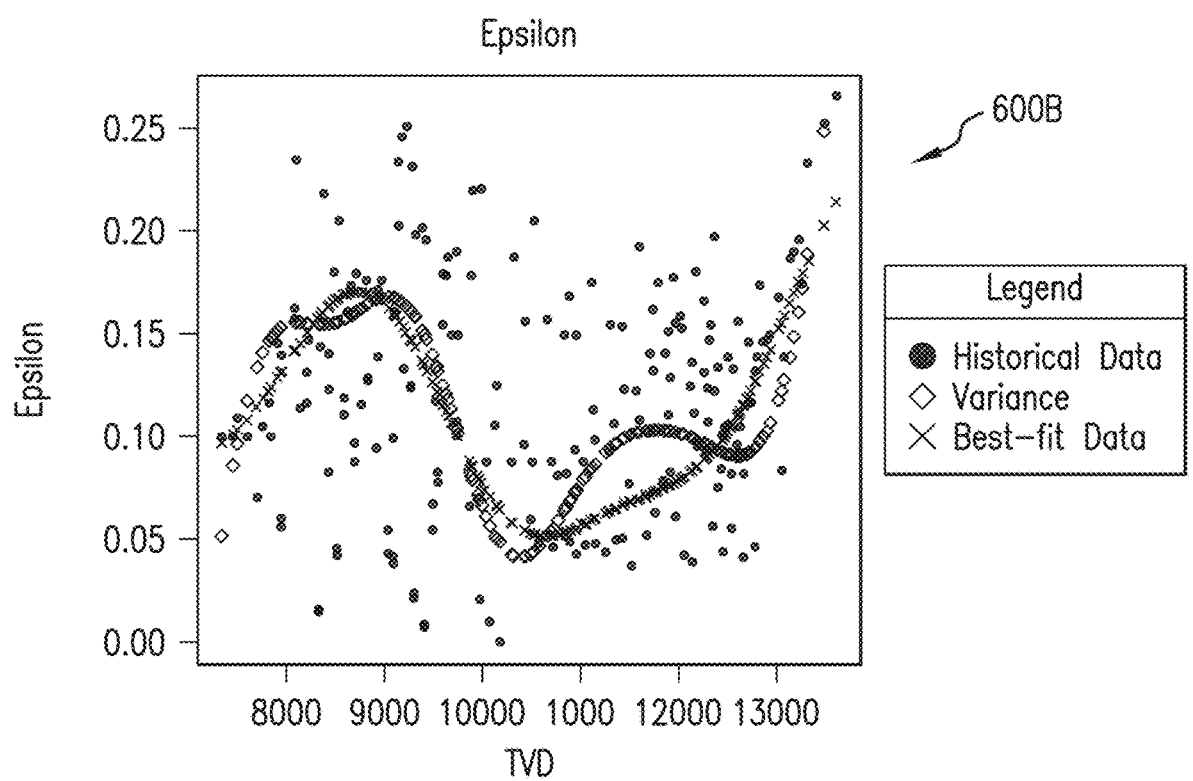
Figure 6C:
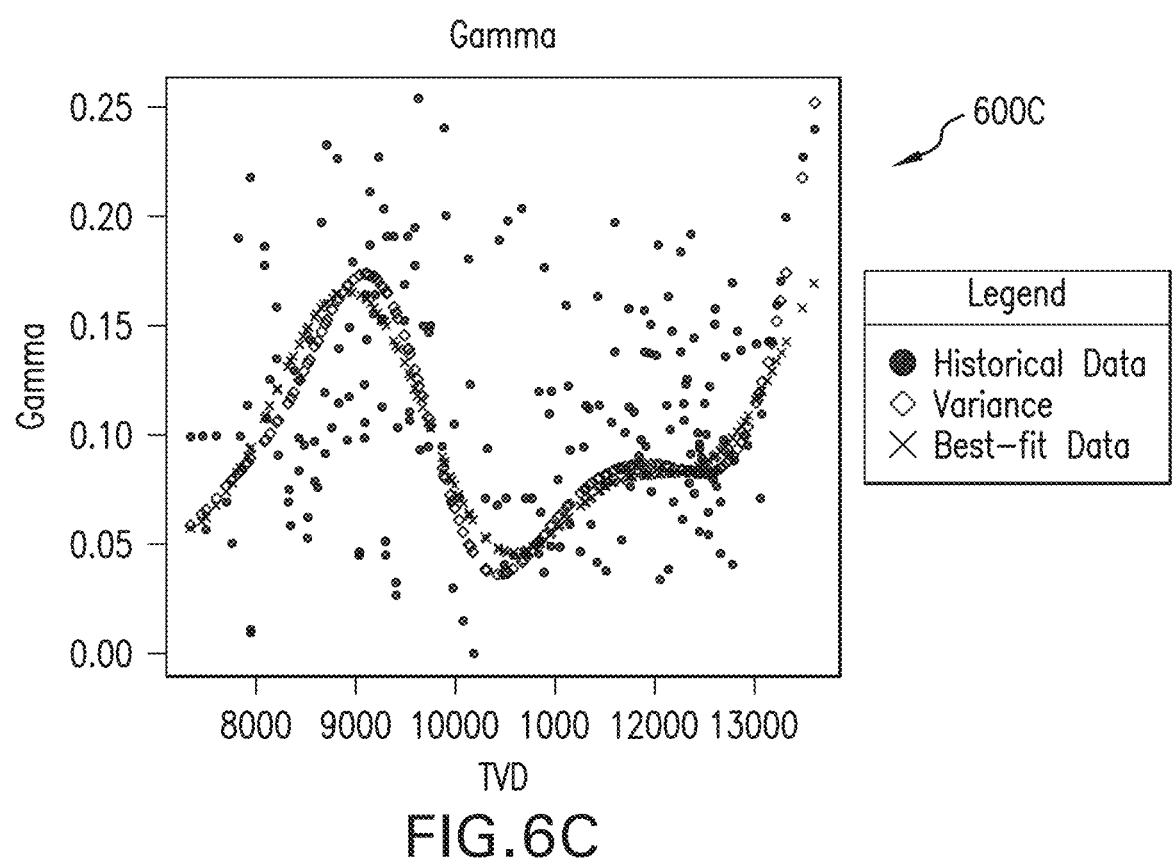

Returning again to FIG. 2, the depths for each velocity component of the historical velocity models obtained in block 204 of process 200 may be correlated to TVD data acquired for the planned well site in block 206. In one or more embodiments, the TVD data for the planned well site may be acquired from well logs obtained from exploratory or offset wells drilled at or near the planned well site. The acquired TVD data from the well logs may then be compared with the TVD data from the historical velocity models obtained in block 204 for the existing well sites selected in block 202 to ensure the formation depths associated with the selected well sites are sufficiently similar to those of the planned well site. In cases where there is a significant difference in TVD between a selected well site and the planned well site, appropriate depth adjustments may be made to the corresponding historical velocity models of the selected well site such that the correlation between the historical and new formation depths is within an acceptable or predetermined tolerance range for a particular implementation. In one or more embodiments, block 206 may further include performing a classification and non-linear regression on the historical microseismic velocity models obtained in block 204 to identify the best-fitting velocity components and then, correlating the depths of the best-fitting velocity components to the TVD data for the planned well site. The classification and regression in block 206 may be performed after making any adjustments to the historical velocity models based on the depth comparisons described above. FIGS. 6A, 6B, and 6C are data plots 600A, 600B and 600C illustrating examples of the best-fitting $V_P$, epsilon, and gamma velocity components, respectively, based on a non-linear regression on the historical velocity models. FIG. 7 is a table 700 illustrating values of the best-fitting $V_P$, $V_S$, delta, epsilon, and gamma velocity model components sorted by TVD for a planned well site.

In some implementations, process 200 may proceed to blocks 208 and 210 for verifying whether the correlation between the depths associated with each velocity component of the historical microseismic velocity models and depths associated with the well log data acquired for the planned well site is within a predetermined acceptable accuracy range. When the correlation is determined not to be within the predetermined accuracy range in block 210, process 200 may return to block 202 and the operations in blocks 202, 204, and 206 for selecting, obtaining, and correlating, respectively, may be repeated until the correlation is determined to be within the predetermined accuracy range. However, as indicated in by the dotted lines in FIG. 2, the verification operations in blocks 208 and 210 may be optional and performed as needed or desired for a particular implementation.

Figure 8:
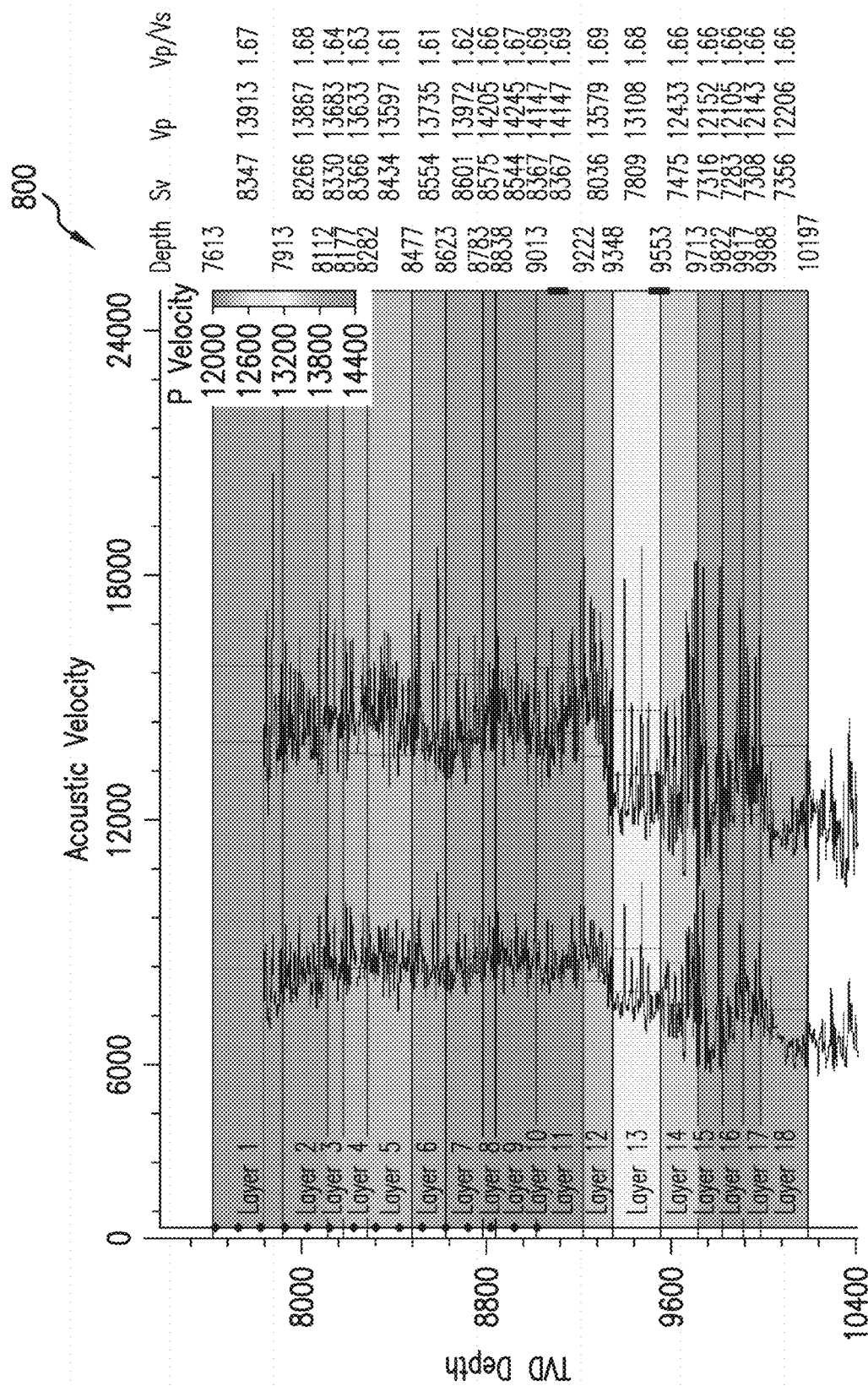
FIG. 8 is an illustrative visualization of velocity data for different layer depths of an initial microseismic velocity model derived from historical velocity models.

Once the depths are correlated (and the correlation verified), process 200 may proceed to block 212, which includes generating an initial microseismic velocity model for the planned well site, based on the correlated depths. The initial microseismic velocity model generated in block 212 may include a plurality of layers corresponding to the correlated depths. FIG. 8 is an illustrative visualization 800 showing an example of velocity data for different layer depths of an initial microseismic velocity model including velocity components derived from the correlated depths of historical velocity model components, as described above.

In block 214, the initial microseismic velocity model generated for the planned well site may be used to simulate seismic wave propagation through different formation layers represented by the model. In block 216, the locations of one or more microseismic events of interest within the subsurface formation associated with the planned well site, based on the simulated wave propagation. Such events may be any of various seismic events that can occur within the subsurface formation, including, but not limited to, earthquakes and perforating events for creating perforations within the formation during downhole operations at the well site.

In one or more embodiments, measurements indicating the actual locations of the one or more microseismic events of interest within the subsurface formation may be acquired from one or more seismic measurement devices during a downhole operation at the planned well site. The actual locations of the one or more microseismic events of interest may be compared to the locations estimated using the initial microseismic velocity model. Any difference determined from the comparison between the actual and estimated locations, may be used to optimize or refine the initial microseismic velocity model and thereby, improve the accuracy of the model for estimating locations of the events during subsequent stages of the downhole operation. For example, the downhole operation may be a multistage hydraulic fracturing operation, and the microseismic events of interest may include perforating events associated with perforating devices creating fluid injection points along a length of a wellbore within the subsurface formation. Accordingly, actual microseismic data acquired for events of interest during a current stage of the downhole operation along the wellbore may be used to update the initial velocity model and produce more accurate estimates of event locations for a subsequent stage of the operation.

Figure 9A:
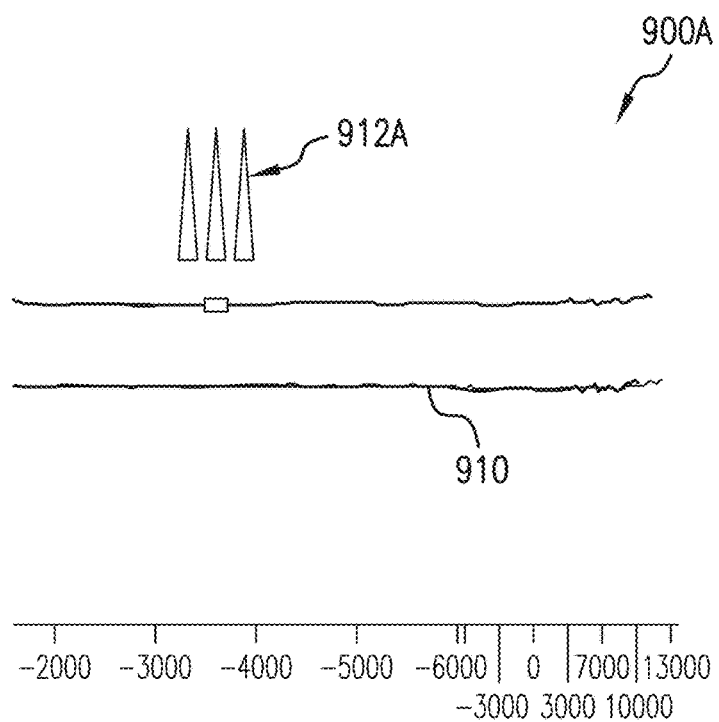
FIGS. 9A and 9B are wellbore diagrams illustrating a comparison between estimated perforation locations determined before and after optimizing an initial velocity model, respectively.
Figure 9B:
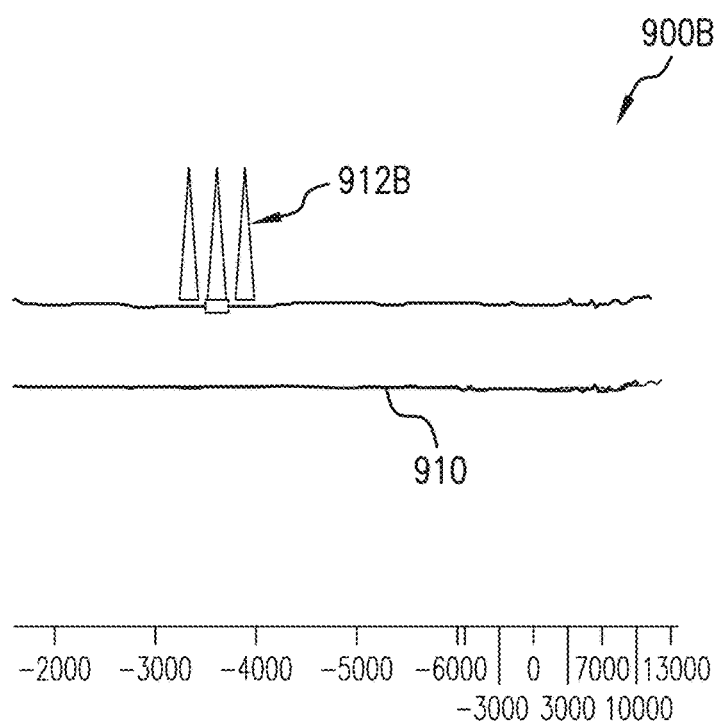

FIGS. 9A and 9B are wellbore diagrams 900A and 900B illustrating a comparison between estimated perforation locations along a wellbore 910 before and after optimizing an initial velocity model, respectively, as described above. The model in this example may be optimized based on actual microseismic data acquired during downhole operations along wellbore 910. In FIG. 9A, an estimated location 912A of the perforations using the initial velocity model substantially deviates from their expected location within the formation adjacent to wellbore 910. By contrast, FIG. 9B shows that the optimized velocity model produces a more accurate estimated location 912B of the perforations that coincides with the expected location adjacent to wellbore 910.

By improving the accuracy of location estimates for such events of interest, the disclosed velocity modeling techniques provide a significant reduction in the post-processing time that is typically needed to adjust or clean up event locations, e.g., perforating locations, selected during various stages of a microseismic mapping projects. Having a competent velocity model in the early stages of a real-time mapping project ensures more location accuracy and eliminates the need to continuously update the velocity model, recalculate the locations during a later stage for all previous stages, and spending a great deal of time to reduce the number of velocity models that are in use. Further, the initial velocity models generated using the disclosed techniques may be used to automate the locating of relevant events for microseismic surveys using fiber-optic equipment. Such models may provide a solution to the optimization problems generally associated with velocity models used in microseismic operations involving the deployment of fiber in a treatment or offset well without having a vertical geophone array nearby.

FIG. 10 is a block diagram of an exemplary computer system 1000 in which embodiments of the present disclosure may be implemented. For example, process 300 of FIG. 3, as described above, may be implemented using system 1000. System 1000 can be a computer, phone, PDA, or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for performing the microseismic velocity modeling techniques disclosed herein. From these various memory units, processing unit(s) 1012 retrieves instructions to execute and data to process in order to execute the processes of some implementations, e.g., process 200 of FIG. 2 as described above.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the operations for performing process 200 of FIG. 2, as described above, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments. It should be appreciated that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for producing an optimal starting velocity model for new microseismic mapping projects. Accordingly, advantages of the present disclosure include increased accuracy of event locations during real-time mapping of subsurface geological structures for hydrocarbon exploration and production, reduced time and costs for optimizing velocity models during both real-time and post-processing phases of well site operations, e.g., for purposes of "self-tuning" a database or repository of historical velocity models from previously mapped wells as these new velocity models are incorporated after job completion. For example, a Support Vector Machine (SVM) algorithm may be used to classify the individual velocity components (e.g., $V_P$, $V_S$, delta, epsilon, and gamma components) of each model into near equal parts, dividing the dataset by a non-linear regression. This regression may be improved by using the input historical velocity data to further train the algorithm to provide a more accurate classification. This process may be repeated for all velocity components. The (x, y) pairs from the resulting trained regression lines from all velocity components may be used to define the output velocity model, e.g., as described above with respect to FIG. 7. The depth range of recording for mapping a new project well may then be compared to the output velocity model to determine and select the velocities that fall within that range. This revised velocity model may then be used for the new mapping project.

A computer-implemented method of generating microseismic velocity models has been described. Embodiments of the method may include: selecting, by a computer system, one or more existing well sites in proximity to a planned well site; obtaining historical microseismic velocity models associated with the one or more existing well sites, each of the historical microseismic velocity models including a plurality of velocity components for different formation depths; correlating the formation depths for each velocity component of the historical microseismic velocity models to formation depths from well logs acquired for a subsurface formation associated with the planned well site; performing a classification and non-linear regression on the historical microseismic velocity models to identify the best-fitting velocity components for layers of the subsurface formation corresponding to the correlated formation depths; generating an initial microseismic velocity model of the subsurface formation for the planned well site using the best-fitting velocity components; simulating seismic wave propagation through each layer of the subsurface formation using the initial microseismic velocity model generated for the planned well site; and estimating locations of one or more microseismic events of interest within the subsurface formation associated with the planned well site, based on the simulated wave propagation.

Likewise, embodiments of a computer-readable storage medium having instructions stored therein have been described, where the instructions, when executed by a processor, may cause the processor to perform a plurality of functions, including functions to: select one or more existing well sites in proximity to a planned well site; obtain historical microseismic velocity models associated with the one or more existing well sites, each of the historical microseismic velocity models including a plurality of velocity components for different formation depths; correlate the formation depths for each velocity component of the historical microseismic velocity models to formation depths from well logs acquired for a subsurface formation associated with the planned well site; perform a classification and non-linear regression on the historical microseismic velocity models to identify the best-fitting velocity components for layers of the subsurface formation corresponding to the correlated formation depths; generate an initial microseismic velocity model of the subsurface formation for the planned well site using the best-fitting velocity components; simulate seismic wave propagation through each layer of the subsurface formation using the initial microseismic velocity model generated for the planned well site; and estimate locations of one or more microseismic events of interest within the subsurface formation associated with the planned well site, based on the simulated wave propagation.

The foregoing embodiments of the method or computer-readable storage medium may include any one or any combination of the following elements, features, functions, or operations: performing a downhole operation at the planned well site, based on the estimated locations of the one or more microseismic events of interest; comparing the formation depths associated with the one or more existing well sites to the depth data associated with the planned well site, determining whether a difference in formation depth between the planned well site and at least one of the existing well sites exceeds a predetermined tolerance range, based on the comparison, and when the difference in formation depth is determined to exceed the predetermined tolerance range, adjusting one or more of the historical microseismic velocity models such that the difference in formation depth is within the predetermined tolerance range; determining whether the correlation between the formation depths associated with each velocity component of the historical microseismic velocity models and the formation depths associated with the well logs acquired for the planned well site is within a predetermined accuracy range and when the correlation is determined not to be within the predetermined accuracy range, repeating the selecting, the obtaining, and the correlating until the correlation is determined to be within the predetermined accuracy range, wherein the initial microseismic velocity model is generated in response to determining that the correlation is within the predetermined accuracy range; acquiring, from one or more seismic measurement devices, microseismic data indicating actual locations of the one or more microseismic events of interest within the subsurface formation, comparing the actual locations of the one or more microseismic events of interest with the corresponding locations estimated using the initial microseismic velocity model, determining a difference between the actual and estimated locations, based on the comparison, and refining the initial microseismic velocity model based on the difference.

The downhole operation in one or more of the foregoing embodiments of the method or computer-readable storage medium may be a hydraulic fracturing operation, and the microseismic events of interest may include perforating events associated with perforating devices creating fluid injection points along a length of a wellbore within the subsurface formation. Furthermore, the one or more existing well sites in these one or more embodiments of the method or the computer-readable storage medium may be selected from a plurality of previously mapped well sites within a hydrocarbon producing field, and the historical microseismic velocity models associated with the one or more existing well sites may be obtained from a database of historical microseismic velocity models for each of the plurality of previously mapped well sites, where selected well sites may include previously mapped well sites within a predetermined distance of the planned well site or previously mapped well sites that are selected based on proximity and a degree of similarity between formation properties of each previously mapped well site and the planned well site.

Also, embodiments of a system including at least one processor and a memory coupled to the processor have been described, where the memory stores instructions, which, when executed by a processor, may cause the processor to perform a plurality of functions, including functions to: select one or more existing well sites in proximity to a planned well site; retrieve historical microseismic velocity models associated with the one or more existing well sites, each of the historical microseismic velocity models including a plurality of velocity components for different formation depths; correlate the formation depths for each velocity component of the historical microseismic velocity models to formation depths from well logs acquired for a subsurface formation associated with the planned well site; perform a classification and non-linear regression on the historical microseismic velocity models to identify the best-fitting velocity components for layers of the subsurface formation corresponding to the correlated formation depths; generate an initial microseismic velocity model of the subsurface formation for the planned well site using the best-fitting velocity components; simulate seismic wave propagation through each layer of the subsurface formation using the initial microseismic velocity model generated for the planned well site; and estimate locations of one or more microseismic events of interest within the subsurface formation associated with the planned well site, based on the simulated wave propagation.

In one or more of the foregoing embodiments of the system, the functions performed by the processor may further include any one or any combination of functions to: perform a downhole operation at the planned well site, based on the estimated locations of the one or more microseismic events of interest; compare the formation depths associated with the one or more existing well sites to the depth data associated with the planned well site; determine whether a difference in formation depth between the planned well site and at least one of the existing well sites exceeds a predetermined tolerance range, based on the comparison; when the difference in formation depth is determined to exceed the predetermined tolerance range, adjust one or more of the historical microseismic velocity models such that the difference in formation depth is within the predetermined tolerance range; determine whether the correlation between the formation depths associated with each velocity component of the historical microseismic velocity models and the formation depths associated with the well logs acquired for the planned well site is within a predetermined accuracy range; when the correlation is determined not to be within the predetermined accuracy range, repeat the selection of existing well sites, the retrieval of historical microseismic velocity models, and the correlation of formation depths until the correlation is determined to be within the predetermined accuracy range, wherein the initial microseismic velocity model is generated in response to determining that the correlation is within the predetermined accuracy range; acquire, from one or more seismic measurement devices, microseismic data indicating actual locations of the one or more microseismic events of interest within the subsurface formation; compare the actual locations of the one or more microseismic events of interest with the corresponding locations estimated using the initial microseismic velocity model; determine a difference between the actual and estimated locations, based on the comparison; and refine the initial microseismic velocity model based on the difference.

The downhole operation in one or more of the foregoing embodiments of the system may be a hydraulic fracturing operation, and the microseismic events of interest may include perforating events associated with perforating devices creating fluid injection points along a length of a wellbore within the subsurface formation. Furthermore, the one or more existing well sites in these one or more embodiments of the system may be selected from a plurality of previously mapped well sites within a hydrocarbon producing field, and the historical microseismic velocity models associated with the one or more existing well sites may be obtained from a database of historical microseismic velocity models for each of the plurality of previously mapped well sites, where selected well sites may include previously mapped well sites within a predetermined distance of the planned well site or previously mapped well sites that are selected based on proximity and a degree of similarity between formation properties of each previously mapped well site and the planned well site.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of generating microseismic velocity models, the method comprising:
   selecting, by a computer system, one or more existing well sites in proximity to a planned well site;
   obtaining historical microseismic velocity models associated with the one or more existing well sites, each of the historical microseismic velocity models including a plurality of velocity components for different formation depths;
   correlating the formation depths for each velocity component of the historical microseismic velocity models to formation depths from well logs acquired for a subsurface formation associated with the planned well site;
   performing a classification and non-linear regression on the historical microseismic velocity models to identify the best-fitting velocity components for layers of the subsurface formation corresponding to the correlated formation depths;
   generating an initial microseismic velocity model of the subsurface formation for the planned well site using the best-fitting velocity components;

simulating seismic wave propagation through each layer of the subsurface formation using the initial microseismic velocity model generated for the planned well site; and estimating locations of one or more microseismic events of interest within the subsurface formation associated with the planned well site, based on the simulated wave propagation.

2. The method of claim 1, further comprising:

performing a downhole operation at the planned well site, based on the estimated locations of the one or more microseismic events of interest.

3. The method of claim 2, wherein the downhole operation is a hydraulic fracturing operation, and the microseismic events of interest include perforating events associated with perforating devices creating fluid injection points along a length of a wellbore within the subsurface formation.

4. The method of claim 1, wherein correlating further comprises:

comparing the formation depths associated with the one or more existing well sites to the depth data associated with the planned well site;

determining whether a difference in formation depth between the planned well site and at least one of the existing well sites exceeds a predetermined tolerance range, based on the comparison; and when the difference in formation depth is determined to exceed the predetermined tolerance range, adjusting one or more of the historical microseismic velocity models such that the difference in formation depth is within the predetermined tolerance range.

5. The method of claim 1, further comprising:

determining whether the correlation between the formation depths associated with each velocity component of the historical microseismic velocity models and the formation depths associated with the well logs acquired for the planned well site is within a predetermined accuracy range; and when the correlation is determined not to be within the predetermined accuracy range, repeating the selecting, the obtaining, and the correlating until the correlation is determined to be within the predetermined accuracy range, wherein the initial microseismic velocity model is generated in response to determining that the correlation is within the predetermined accuracy range.

6. The method of claim 1, further comprising:

acquiring, by the computer system from one or more seismic measurement devices, microseismic data indicating actual locations of the one or more microseismic events of interest within the subsurface formation;

comparing the actual locations of the one or more microseismic events of interest with the corresponding locations estimated using the initial microseismic velocity model;

determining a difference between the actual and estimated locations, based on the comparison; and refining the initial microseismic velocity model based on the difference.

7. The method of claim 1, wherein the one or more existing well sites are selected from a plurality of previously mapped well sites within a hydrocarbon producing field.

8. The method of claim 7, wherein the one or more existing well sites include previously mapped well sites within a predetermined distance of the planned well site.

9. The method of claim 7, wherein the one or more existing well sites are selected from the plurality of previously mapped well sites based on proximity and a degree of similarity between formation properties of each previously mapped well site and the planned well site.

10. The method of claim 7, wherein the historical microseismic velocity models associated with the one or more existing well sites are obtained from a database of historical microseismic velocity models for each of the plurality of previously mapped well sites.

11. A system comprising:

a processor; and a memory coupled to the processor having instructions stored therein, which when executed by the processor, cause the processor to perform a plurality of functions, including functions to:

select one or more existing well sites in proximity to a planned well site;

retrieve historical microseismic velocity models associated with the one or more existing well sites, each of the historical microseismic velocity models including a plurality of velocity components for different formation depths;

correlate the formation depths for each velocity component of the historical microseismic velocity models to formation depths from well logs acquired for a subsurface formation associated with the planned well site;

perform a classification and non-linear regression on the historical microseismic velocity models to identify the best-fitting velocity components for layers of the subsurface formation corresponding to the correlated formation depths;

generate an initial microseismic velocity model of the subsurface formation for the planned well site using the best-fitting velocity components;

simulate seismic wave propagation through each layer of the subsurface formation using the initial microseismic velocity model generated for the planned well site; and estimate locations of one or more microseismic events of interest within the subsurface formation associated with the planned well site, based on the simulated wave propagation.

12. The system of claim 11, wherein the functions performed by the processor further include function to:

perform a downhole operation at the planned well site, based on the estimated locations of the one or more microseismic events of interest.

13. The system of claim 12, wherein the downhole operation is a hydraulic fracturing operation, and the microseismic events of interest include perforating events associated with perforating devices creating fluid injection points along a length of a wellbore within the subsurface formation.

14. The system of claim 11, wherein the functions performed by the processor further include function to:

compare the formation depths associated with the one or more existing well sites to the depth data associated with the planned well site;

determine whether a difference in formation depth between the planned well site and at least one of the existing well sites exceeds a predetermined tolerance range, based on the comparison; and when the difference in formation depth is determined to exceed the predetermined tolerance range, adjust one or more of the historical microseismic velocity models such that the difference in formation depth is within the predetermined tolerance range.

15. The system of claim 11, wherein the functions performed by the processor further include function to:

determine whether the correlation between the formation depths associated with each velocity component of the historical microseismic velocity models and the formation depths associated with the well logs acquired for the planned well site is within a predetermined accuracy range; and when the correlation is determined not to be within the predetermined accuracy range, repeat the selection of existing well sites, the retrieval of historical microseismic velocity models, and the correlation of formation depths until the correlation is determined to be within the predetermined accuracy range, wherein the initial microseismic velocity model is generated in response to determining that the correlation is within the predetermined accuracy range.

16. The system of claim 11, wherein the functions performed by the processor further include function to:

acquire, from one or more seismic measurement devices, microseismic data indicating actual locations of the one or more microseismic events of interest within the subsurface formation;

compare the actual locations of the one or more microseismic events of interest with the corresponding locations estimated using the initial microseismic velocity model;

determine a difference between the actual and estimated locations, based on the comparison; and refine the initial microseismic velocity model based on the difference.

17. The system of claim 11, wherein the one or more existing well sites are selected from a plurality of previously mapped well sites within a hydrocarbon producing field, and the historical microseismic velocity models associated with the one or more existing well sites are retrieved from a database of historical microseismic velocity models for each of the plurality of previously mapped well sites.

18. The system of claim 17, wherein the one or more existing well sites include previously mapped well sites within a predetermined distance of the planned well site.

19. The system of claim 17, wherein the one or more existing well sites are selected from the plurality of previously mapped well sites based on proximity and a degree of similarity between formation properties of each previously mapped well site and the planned well site.

20. A computer-readable storage medium having instructions stored therein, which when executed by a computer cause the computer to perform a plurality of functions, including functions to:

select one or more existing well sites in proximity to a planned well site;

obtain historical microseismic velocity models associated with the one or more existing well sites, each of the historical microseismic velocity models including a plurality of velocity components for different formation depths;

correlate the formation depths for each velocity component of the historical microseismic velocity models to formation depths from well logs acquired for a subsurface formation associated with the planned well site;

perform a classification and non-linear regression on the historical microseismic velocity models to identify the best-fitting velocity components for layers of the subsurface formation corresponding to the correlated formation depths;

generate an initial microseismic velocity model of the subsurface formation for the planned well site using the best-fitting velocity components;

simulate seismic wave propagation through each layer of the subsurface formation using the initial microseismic velocity model generated for the planned well site; and estimate locations of one or more microseismic events of interest within the subsurface formation associated with the planned well site, based on the simulated wave propagation.

* * * * *